US012645869B2

(12) United States Patent
Daniel

(10) Patent No.: US 12,645,869 B2
(45) Date of Patent: Jun. 2, 2026

(54) INTELLIGENT FORM FILLING

(71) Applicant: Carlota Daniel, Kitchener (CA)

(72) Inventor: Carlota Daniel, Kitchener (CA)

(73) Assignee: Ricoh Company, Ltd., Tokyo (JP)

( * ) Notice: Subject to any disclaimer, the term of this patent is extended or adjusted under 35 U.S.C. 154(b) by 311 days.

(21) Appl. No.: 18/119,123

(22) Filed: Mar. 8, 2023

(65) Prior Publication Data

US 2024/0303418 A1 Sep. 12, 2024

(51) Int. Cl.
G06F 17/00 (2019.01)
G06F 40/174 (2020.01)
G06F 40/242 (2020.01)

(52) U.S. Cl.
CPC .......... G06F 40/174 (2020.01); G06F 40/242 (2020.01)

(58) Field of Classification Search
CPC .............................. G06F 40/174; G06F 40/242
See application file for complete search history.

(56) References Cited

U.S. PATENT DOCUMENTS

| | | | | |
|---|---|---|---|---|
| 2011/0271173 A1* | 11/2011 | Ait-Mokhtar | ......... | G06F 40/174 |
| | | | | 715/226 |
| 2016/0217119 A1 | 7/2016 | Dakin et al. | | |
| 2017/0046622 A1* | 2/2017 | Gaither | ................. | G06F 40/247 |
| 2019/0332374 A1* | 10/2019 | Harner | ...................... | G06F 8/34 |

| | | | | |
|---|---|---|---|---|
| 2021/0329081 A1* | 10/2021 | Singh | ......................... | G06F 8/38 |
| 2022/0129577 A1* | 4/2022 | Joshy | ..................... | G06F 21/645 |
| 2024/0111736 A1* | 4/2024 | Dahari | .................... | G06F 40/30 |

OTHER PUBLICATIONS

Wang, Shaohua, et al. "An intelligent framework for auto-filling web forms from different web applications." 2013 IEEE Ninth World Congress on Services. IEEE, 2013 (Year: 2013).*
Hartmann, Melanie, and Max Muhlhauser. "Context-aware form filling for web applications. " 2009 IEEE International Conference on Semantic Computing. IEEE, 2009 (Year: 2009).*
Winckler, Marco, et al. "An approach and tool support for assisting users to fill-in web forms with personal information." Proceedings of the 29th ACM international conference on Design of communication. 2011 (Year: 2011).*

* cited by examiner

*Primary Examiner* — Andrew T McIntosh
(74) *Attorney, Agent, or Firm* — Hickman Becker Bingham Ledesma LLP; Stephen R. Tkacs

(57) ABSTRACT

A method, apparatus, and storage media for implementing an intelligent form filling system are provided. The system generates an association between a first field name and a second field name based on entry of field values by users into a first form document at a first device within a plurality of devices connected to a network and stores the association in a field name dictionary data structure at a server device connected to the network to form a field name association. The system identifies a field name in a second form document that matches the first field name or the second field name in the field name association. In response to the second user entering a value into the identified field, the system causes to be presented to the second user a prompt to associate the first field name and the second field name in a data file.

19 Claims, 10 Drawing Sheets

```
First Name = Echo
Second Name = Jocelyn
Last Name, Family Name = Riverfriend
Maiden Name = Monroe
Home Phone Number, Mobile Phone Number = 4085550123
Civil Status = Married
Birth Month = April
Birth Date = 1
Birth Year = 1978
Home Address, Current Address, Address = 223 Leisure Street
xxx1 = value1
xxx2 = value2
xxx3, xxx4 = value3
```

```
Company Name = The Business Company
Employer ID Number = 882413
Address = 555 Main Street
Billing Address, Shipping Address = PO Box 5150
yyy1 = value1
yyy2 = value2
yyy3 = value3
```

Scan and Store

Name = Echo Jocelyn Riverfriend
City Address = 223 Leisure Street, Springfield USA
Date of Birth = April 1, 1978
Cell Phone = 4085550123

[EDIT]   [STORE AND SAVE]   [CLOSE]

BACK  NEXT    STORE AND PRINT

Figures 7A, 7B, 7C, 7D:
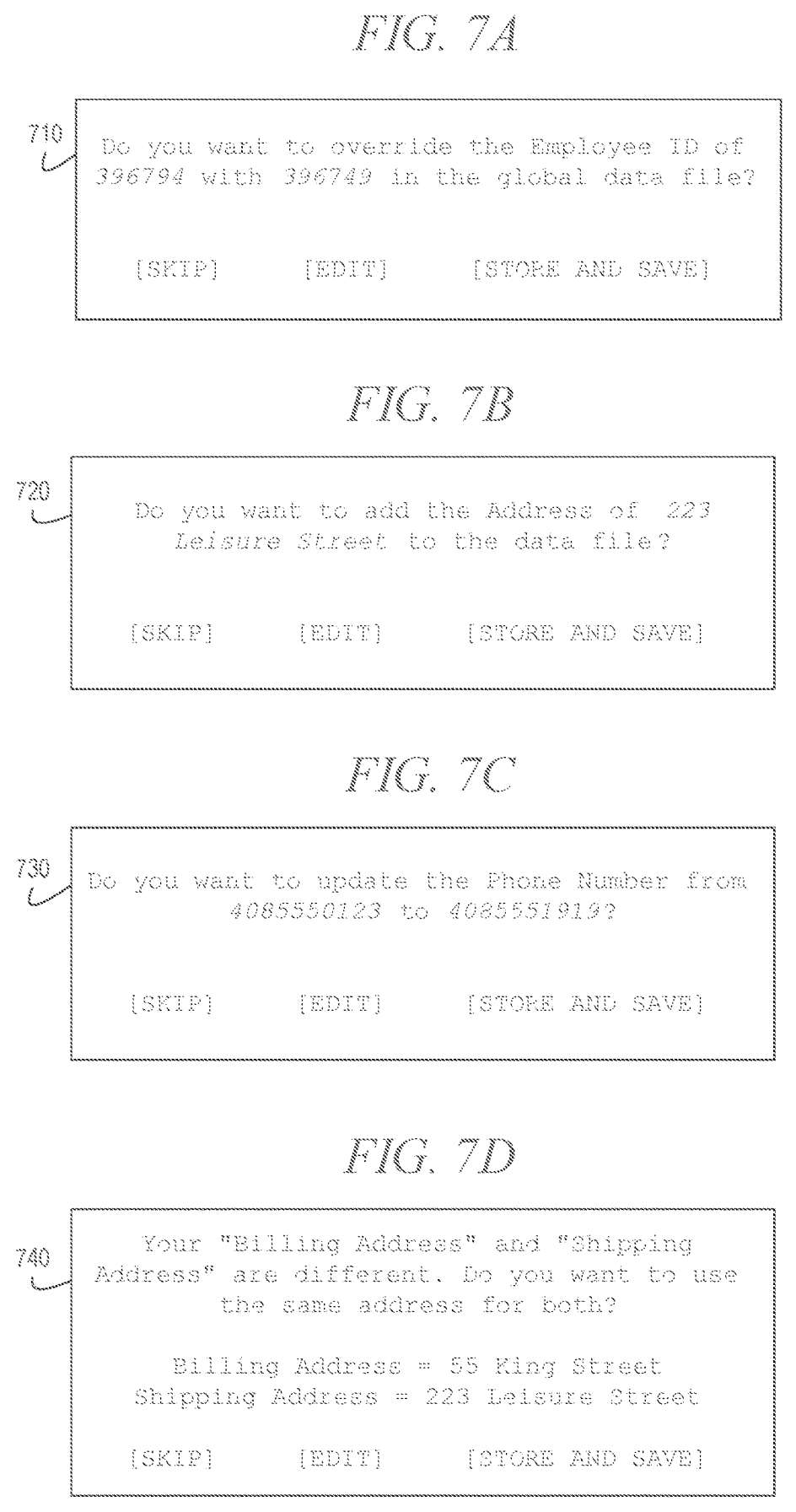

Do you want to override the Employee ID of
396794 with 396749 in the global data file?

[SKIP]      [EDIT]      [STORE AND SAVE]

Do you want to add the Address of 223
Leisure Street to the data file?

[SKIP]      [EDIT]      [STORE AND SAVE]

Do you want to update the Phone Number from
4085550123 to 4085551919?

[SKIP]      [EDIT]      [STORE AND SAVE]

Your "Billing Address" and "Shipping
Address" are different. Do you want to use
the same address for both?

Billing Address = 55 King Street
Shipping Address = 223 Leisure Street

[SKIP]      [EDIT]      [STORE AND SAVE]

*FIG. 8*

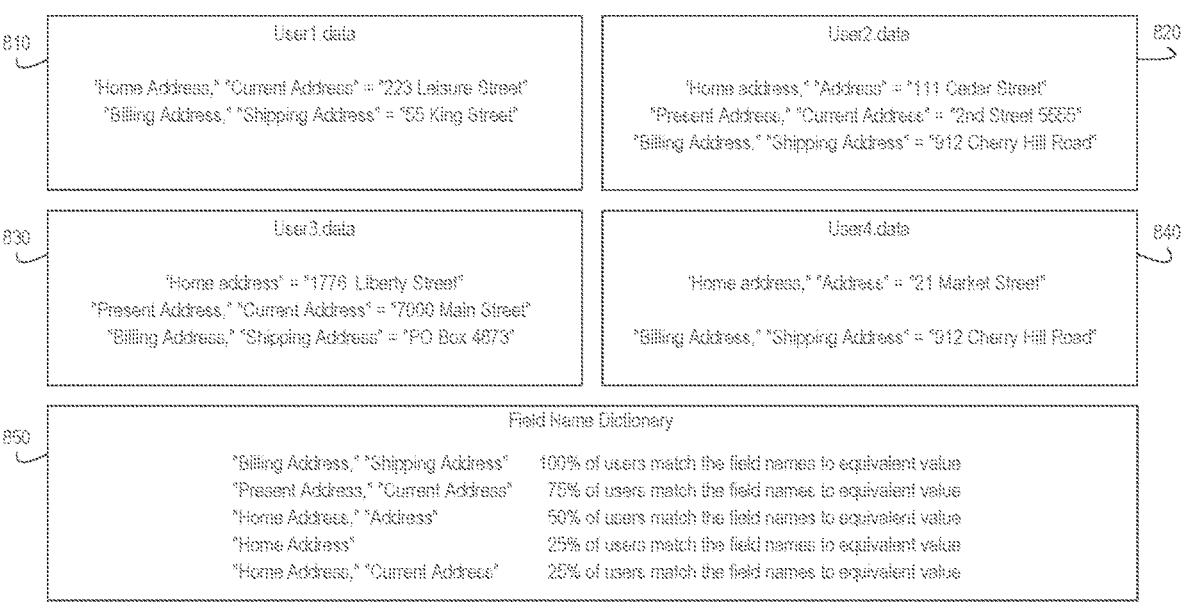

810

User1.data

"Home Address," "Current Address" = "223 Leisure Street"
"Billing Address," "Shipping Address" = "55 King Street"

820

User2.data

"Home address," "Address" = "111 Cedar Street"
"Present Address," "Current Address" = "2nd Street 5555"
"Billing Address," "Shipping Address" = "912 Cherry Hill Road"

830

User3.data

"Home address" = "1776 Liberty Street"
"Present Address," "Current Address" = "7000 Main Street"
"Billing Address," "Shipping Address" = "PO Box 4873"

840

User4.data

"Home address," "Address" = "21 Market Street"

"Billing Address," "Shipping Address" = "912 Cherry Hill Road"

850

Field Name Dictionary

| | |
|---|---|
| "Billing Address," "Shipping Address" | 100% of users match the field names to equivalent value |
| "Present Address," "Current Address" | 75% of users match the field names to equivalent value |
| "Home Address," "Address" | 50% of users match the field names to equivalent value |
| "Home Address" | 25% of users match the field names to equivalent value |
| "Home Address," "Current Address" | 25% of users match the field names to equivalent value |

INTELLIGENT FORM FILLING

TECHNICAL FIELD

The illustrative embodiments relate to intelligent form filling for networked devices with multiple users.

BACKGROUND

A form is a document with fields for receiving entry of data or information. Tax documents, immigration documents, or insurance claims are examples of form documents that are encountered every day by people around the world. Some existing electronic forms, such as those in Portable Document Format (PDF), include data entry fields built into the form. For example, a form may contain fields for entering a first and last name, street address, telephone number, or other types of information that are required by the entity processing the form. These form documents require time for filling in values, review, and revision, whether performed using paper or electronic forms. A simple mistake can result in repeated effort or a waste of resources, such as toner or paper. Even with electronic forms, processing of form documents requires a great deal of duplicative efforts, particularly when filling out multiple different forms and even within a long form with multiple fields for which the same value may apply.

Some approaches implement automated form filling using a small set of personal data that is likely to be encountered, such as name, address, birthdate, credit card number, billing address, etc. While a user can enter and edit values for these fields, the set of personal data does not expand as new fields are encountered. Other approaches gather personal data values and build forms, such as tax return documents. These approaches limit their personal data to the forms being built and do not leverage data previously entered for unrelated forms. There are approaches that anticipate that some field may include the same values and ask whether the user wishes to use the same values entered for both fields. For example, many online shopping forms ask whether the user wishes to use the home address as the shipping address or billing address. However, these approaches are hard coded to link these fields together in a given form and do not adapt when new forms or fields are encountered.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

SUMMARY

Techniques are provided for intelligent form filling. The techniques include generating an association between a first field name and a second field name based on entry of field values by at least one user into a form document at a first device within a plurality of devices connected to a network and storing the association in a field name dictionary data structure at a server device connected to the network to form a field name association. In response to another user entering a second form document into a device within the plurality of devices, the techniques include identifying a field name in the second form document that matches the first field name or the second field name in the field name association. In response to the second user entering a field value into a field corresponding to the identified field name in the second form document, the techniques include causing to be presented to the second user a prompt to associate the first field name and the second field name in a data file.

BRIEF DESCRIPTION OF THE DRAWINGS

In the drawings:

FIG. 2 depicts an example user data file in accordance with an embodiment.

FIG. 3 depicts an example company data file in accordance with an embodiment.

FIG. 7A depicts an example user interface screen for overriding a value in a data file with an entered value in accordance with an embodiment.

FIG. 7B depicts an example user interface screen for adding a newly encountered field name to a data file in accordance with an embodiment.

FIG. 7C depicts an example user interface screen for updating an out-of-date value in a data file with a newly added value in accordance with an embodiment.

FIG. 7D depicts an example user interface screen for prompting the user to associate fields and enter the same value when the field names are associated in the field name dictionary data structure in accordance with an embodiment.

FIG. 8 illustrates associating field names based on historic data input from multiple users in accordance with an embodiment.

DETAILED DESCRIPTION

Figure 1:
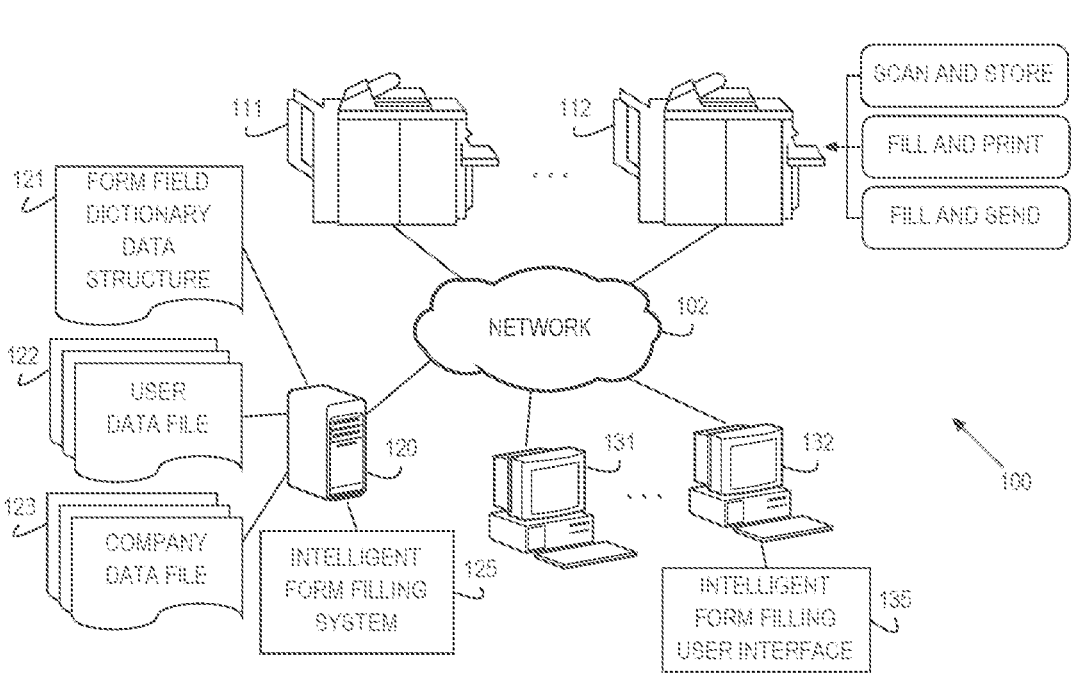
FIG. 1 depicts a networked computer system in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide an intelligent form filling system to optimize a user's operation of a device by providing automatic and intelligent form filling, which reduces the burden on the user to manually enter the same data repetitively on different forms. In implementations, form documents can be entered by loading an electronic form file or by converting a paper document or image to an electronic form by recognizing text field names (using optical character recognition (OCR), for example) and corresponding fields for user input. The intelligent form filling system reads from source data files that contain information in a key-value pair format and fills in the appropriate fields. The source data files may be associated with a user, a company employing the user, or a client of the company employing the user. This greatly reduces paper consumption, saves the user time, and rapidly improves the completeness and accuracy of the entered data.

Implementations of the illustrative embodiments accept different kinds of input forms, including hypertext markup language (HTML) forms, electronic forms, word processing documents, etc. In certain implementations, these forms are accessible via a mobile device, a laptop, or a desktop. In some implementations, if the form is a paper or hardcopy document, the user can scan the document using a scanner or multi-function peripheral (MFP) device to produce an image and perform OCR to generate an electronic document, which the user can store for later processing or fill out using a display and input device of an MFP.

In accordance with an illustrative embodiment, the intelligent form filling system includes a user interface that allows a user to select an input form document to be filled. Upon user authentication, the intelligent form filling system identifies form field names in the input form document and matches them to the name-vale pairs in one or more data files. In one embodiment, the intelligent form filling system allows a user to perform many operations using a user interface in a desktop computer, smartphone, mobile device, or an MFP device. With the ability to fill many pages of documents containing personal or sensitive information, the intelligent form filling system provides secure authentication mechanism for validating the user. The authentication mechanism can be implemented in a server or in a device being operated by the user, such as an MFP device.

In one implementation, a data file may be stored in a storage communicably coupled to a server. In a variation, a data file may be stored in portable storage device, such as a universal serial bus (USB) storage device, secure digital (SD) card, Micro-SD card, or the like. In another variation, the data file may be stored in a smartphone device or other personal device with storage. For example, a user may store the data file on a smartphone that communicates with an MFP using short-range wireless technology (e.g., the Bluetooth™ wireless communication standard) or communicates with a server using wireless fidelity (WiFi) technology. In a particular example, a user may store personal data for the user on a USB storage device and may access company data for an employer or a client in a storage device at a server. The data may be stored in data files using a format that enables associating one or more field names with values in name-value (or key-value) pairs. Examples of file formats that may be used include comma separated values (CSV) files, properties files, extensible markup language (XML) files, text files, spreadsheet tables, etc.

In accordance with the illustrative embodiment, the intelligent form filling system stores a field name dictionary data structure that stores associations of field names based on usage history of users of the system. In some embodiments, the intelligent form filling system generates an association between two or more form field names in response to at least one user entering the same value for both fields. In one embodiment, the field name dictionary data structure stores statistics including, for example, a number of users who have filled in the field, a number of users who have filled in fields corresponding to two or more associated field names with equivalent values, a percentage of users who have filled in fields corresponding to two or more associated field names with equivalent values, a confidence value representing a likelihood that a user will use the same value for two or more associated field names, a number of users who left the field blank, a form identifier that identifies a form in which a field name was encountered, or any combination of the above. In one embodiment, the field name dictionary data structure stores a mapping between form identifiers and the field names encountered in the corresponding forms, although in alternative embodiments, this mapping can be stored in a separate data structure. This information can be used by the intelligent form filling system when a user encounters a particular form or a particular form field for the first time. In another embodiment, the field name dictionary data structure can store global associations and more localized associations, such as associations for geographic regions, departments of a company, categories of forms, individually identified forms, etc. The field name dictionary data structure may be stored using a format that enables associating field names with each other. Examples of file formats that may be used include CSV files, properties files, XML files, text files, spreadsheet tables, etc.

When a user enters a form, such as by scanning a form document or loading a form document file, the intelligent form filling system identifies form field names in the form document and attempts to match the form fields to a data file, which may be for the user, a company employing the user, or a client of the company that employs the user. If a given form field name matches a form field name in the data file, the system enters a value associated with the field name in the data file into the field associated with the field name in the document. In one embodiment, the system automatically enters the value into the field. In an alternative embodiment, the system prompts the user to accept the value for the field or to enter a new value. In some embodiments, the intelligent form filling system uses pattern matching, fuzzy logic, or machine learning techniques, such as a classification model, to match field names. If the system determines that two or more field names match with a confidence greater than a predetermined threshold, and the two or more field names have different values in the data file, then the system can prompt the user to select between two or more values. In an example implementation, the prompt can present the confidence value to the user.

If the intelligent form filling system determines that a given field name does not match a field name in the data file (e.g., does not match with a confidence greater than the predetermined threshold), then the system determines whether the given field name has an association in the field name dictionary data structure. For example, the user may have a value in the data file for a field name, such as "street address," and the form may include another field name, such as "residential address." In this example, the system can consult the field name dictionary data structure that has an association between "street address" and "residential address" with a confidence of 0.93 because 93% of users enter the same values for both fields. Thus, the system can automatically enter, or prompt the user to enter, the value for "street address" into the field corresponding to the "residential address" field name. The intelligent form filling system leverages associations generated from previous users to assist a current user. In an example implementation, the prompt presented to the user can display the confidence value.

The intelligent form filling system of the illustrative embodiment reduces the manual tasks that users perform to fill several pages of documents. The system of the illustrative embodiment automatically stores values entered into fields, generates associations between field names, and carries the field values and associations forward to assist users when entering new forms or when encountering new form fields. The system allows the user to view and update data files to correct out-of-date information or automatically records changes to field values in the data file to save the user time and effort when filling forms in the future. The system also applies stored data and generated associations to paper forms that are scanned into an MFP device, which can then be stored, printed, or sent (e.g., emailed).

Architecture Overview

FIG. 1 depicts a networked computer system 100 in accordance with an illustrative embodiment. The computer system 100 comprises components that are implemented at least partially by hardware at one or more computing devices, such as one or more hardware processors executing program instructions stored in one or more memories for performing functions that are described herein. All functions described herein are intended to indicate operations that are performed using programming in a special-purpose or general-purpose computer in various embodiments. A "computer" or "computing device" may be one or more physical computers, virtual computers, and/or computing devices. As an example, a computer may be one or more server computers, cloud-based computers, a cloud-based cluster of computers, virtual machine instances or virtual machine computing elements such as virtual processors, storage, and memory, data centers, storage devices, desktop computers, laptop computers, mobile devices, and/or any other special-purpose computing devices. Any reference to "a computer" or "a computing device" herein may mean one or more computers unless expressly stated otherwise. The instructions identified above are executable instructions and may comprise one or more executable files or programs that have been compiled or otherwise built based upon source code prepared in the Java™ programming language, C++, OBJECTIVE-C, or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, the networked computer system 100 includes server computer 120, a plurality of multi-function peripheral (MFP) devices 111-112, and one or more client computing devices 131-132, all of which are communicatively coupled via a network 102.

Although the components of FIG. 1 are depicted and described herein in one particular configuration, this is done for explanation purposes only, and the components of the networked computer system 100 may be configured in any manner. For example, while FIG. 1 shows two client computing devices 131-132, more or fewer computing devices may be included. Furthermore, client computing devices 131-132 are shown as desktop computers; however, client computing devices 131-132 may include laptop computers, smartphones, etc. As another example, while FIG. 1 shows two MFP devices 111-112, more or fewer MFP devices may be included.

Network 102 broadly represents a combination of one or more local area networks (LANs), wide area networks (WANs), metropolitan area networks (MANs), global interconnected internetworks, such as public Internet, or a combination thereof. Each such network may use or execute stored programs that implement internetworking protocols according to standards, such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect the network 102 and the disclosure presumes that all components of FIG. 1 are communicatively coupled via network 102. The various components depicted in FIG. 1 may also communicate with each other via direct communications links that are not depicted in FIG. 1 for simplicity of illustration.

MFP devices 111-112 are devices that perform one or more functions, such as copying, scanning, printing, faxing, or a combination thereof. Example implementations of MFP devices 111-112 include, without limitation, small office or home office printers, large commercial copy printers, portable multi-function print devices, or any other print device that is capable of communicating with server computer 120 using a network connection. In an embodiment, the MFP devices 111-112 are equipped with a graphical user interface screen and input device that allow users to enter commands and credential information prior to operating. In the depicted example, MFP devices 111-112 include scan and store, fill and print, and fill and send functions that allow a user to enter a form document into an MFP, fill the form, and store or send the filled or partially filled form to a destination, such as an email address or remote storage.

Each MFP device 111-112 includes a computing architecture that includes a processor and storage. For example, storage may be implemented by volatile storage, non-volatile storage, or any combination of volatile and non-volatile storage. As another example, the storage may be implemented as a portable storage device, such as a USB storage device, SD card, etc. As yet another example, storage may be implemented via connection with a portable computing device, such as a smartphone. For instance, a user may connect the MFP device to a smartphone storage using a USB cable, Bluetooth™ short-range wireless technology, etc. MFP devices 111-112 may be configured to locally store data files or form field dictionary data structures.

In some embodiments, server computer 120 is configured to implement an intelligent form filling system 125. The server computer 120 implements the intelligent form filling system 125 by executing on one or more processors instructions that direct components of the server computer 120 to perform or cause to be performed a set of operations. These operations are described herein as being performed by the intelligent form filling system 125 using the server computer 120 or as being performed by the server computer 120 under control of the instructions of the intelligent form filling system 125.

In some embodiments, client computing devices 131-132 are configured to implement an intelligent form filling user interface 135. The client computing devices 131-132 implement the intelligent form filling user interface 135 by executing on one or more processors instructions that direct components of the client computing devices 131-132 to perform or cause to be performed a set of operations. These operations are described herein as being performed by the intelligent form filling user interface 135 using the client computing devices 131-132 or as being performed by the client computing devices 131-132 under control of the instructions of the intelligent form filling user interface 135. In some embodiments, MFP devices 111-112 are configured to implement the intelligent form filling user interface 135 as described above.

In the depicted implementation, users access the functions of the intelligent form filling system 125 using the user interface 135. In some embodiments, the user interface 135 is a Web-based user interface. In an alternative implementation, the user interface 135 is built using an application programming interface (API) of the intelligent form filling system 125. In some embodiments, the user interface is a graphical user interface (GUI); however, when implemented on an MFP device, the user interface can be configured to use one or more physical control elements of the MFP device.

Server Implementation

In one embodiment, the server computer 120 is configured to implement the intelligent form filling system 125, which stores associations between form fields in field name dictionary data structure 121 and stores values entered by users into user data files 122 and/or company data files 123. Data sent to the server computer 120 is analyzed by the intelligent form filling system 125 so that the next time a user encounters the same form or the same field within a form, the system 125 uses the previously received data and associations based on the data to suggest values for filling in the form.

In some embodiments, a user of user interface 135 authenticates with the intelligent form filling system 125 to determine access privileges of the user. In some implementations, the system 125 supports multiple types of authentication profiles, such as Lightweight Directory Access Protocol (LDAP), OpenID Connect (OIDC), the Okta® identity and access management platform, etc. The system 125 also supports any kind of authentication types, such as password-based authentication, personal identification number (PIN), etc.

The intelligent form filling system 125 accepts form documents in a variety of document formats (e.g., PDF documents, word processing documents, HTTP, Webforms, etc.). Multiple users can access the intelligent form filling system 125 at the same time or at different times using multiple devices, such as MFP devices 111-112 and/or client computing devices 131-132. When a user enters a form document into a device 111-112, 131-132, the intelligent form filling system 125 analyzes the document and identifies form field names in the form. The system 125 matches the identified field names to a data file, such as a user data file 122 or a company data file 123. In one example implementation, when the user is filling a personal form, such as an employment application, passport application, tax return document, etc., the system 125 matches identified field names with a user data file 122 associated with the user. In a variation, when the user is filling a work form, such as a purchase agreement, a partnership agreement, a business proposal estimate, etc., the system 125 matches identified field names with company data file 123 associated with the company or a client of the company. In another variation, the system 125 can match identified field names with both user data files 122 for some fields and company data files 123 for other fields.

If the intelligent form filling system 125 finds a match between an identified field name and a field name in a data file, then the system automatically enters the value associated with the field name in the data file into the form field. In one embodiment, the system can derive a value based on one or more values in the data file. For example, the system can derive a value for an "Age" field if the data file has a value for a "Birthdate" field name. The system can also automatically enter known values, such as a current date. In one variation, the system 125 causes a prompt to be presented in the user interface 135 for the user to accept the value or enter a new value for the field. In one implementation, if the system 125 finds a match between an identified field name and multiple data files, such as user data file 122 and company data file 123, with different values, then the system prompts the user to select between the multiple values or to enter a new value for the field.

If the intelligent form filling system 125 does not find a match between an identified field name and a field name in a data file, then the system adds the field name to a data file selected by the user in association with the value entered by the user. Thus, the first time a user encounters a particular field in a form, the user enters a value for the field, and the system 125 stores the field name in association with the entered value. The user may select whether the value should be stored in a user data file 122 or a company data file 123. Furthermore, if the intelligent form filling system 125 does not find a match between an identified field name and a field name in a data file, then the system adds the field name to the field name dictionary data structure 121.

In accordance with the illustrative embodiment, the intelligent form filling system 125 is configured to generate associations between field names for which at least one user has entered the same value. Thus, if the user enters the same value for multiple field names (e.g., "current address" and "shipping address"), then the system 125 generates an association between these field names. The system 125 links associated field names together in the data file and stores the entered value in association with the linked field names.

Also, in accordance with the illustrative embodiment, the system 125 stores the association between form field names in the field name dictionary data structure 121. In some embodiments, the system 125 also stores user statistics for the association, such as a number of users who have filled in fields corresponding to two or more associated field names with equivalent values, a percentage of users who have filled in fields corresponding to two or more associated field names with equivalent values, a confidence value representing a likelihood that a user will use the same value for two or more associated field names, a number of users who left the field blank, a form identifier that identifies a form in which a field name was encountered, or any combination of the above. Thus, the field name dictionary data structure 121 stores field names that have been encountered by users of the intelligent form filling system 125, associations between field names that have been linked by at least one user, and some statistics that are used to determine a confidence value representing a likelihood that field names will be linked by other users. In some embodiments, the field name dictionary data structure 121 stores other information, such as form identification information, a mapping between form IDs and the fields found in the respective form, etc.

In accordance with an illustrative embodiment, if the intelligent form filling system 125 does not find a match between an identified field name and a field name in a data file, then the system determines whether the identified field name has an association stored in the field name dictionary data structure 121. If the identified field name has an association with a field name that matches a field name in the data file, then the system 125 determines whether a value from the data file can be used for the identified field name. For example, if a user's data file has a value for "current address" and a field name of "shipping address" is encountered, the system 125 can determine that the field names of "current address" and "shipping address" are linked (have an association) based on the field name dictionary data structure 121. The system 125 can then use the value for "current address" from the data file for the field named "shipping address."

In some embodiments, the intelligent form filling system 125 uses a set of rules for determining whether to automatically populate a field with a value and whether to prompt the user to accept a value or an association between field names. In one embodiment, the system 125 determines a confidence value for each association between field names and compares the confidence value to one or more thresholds. For example, the system 125 may determine a confidence value based on a percentage of users who enter the same value for two or more field names and compare the threshold value to a first threshold. The system 125 may also ignore associations until a predetermined number of users have encountered both field names. If the predetermined number of users have encountered both field names and the confidence value is less than the first threshold, then the system 125 may assume that the user will not associate the two field names and prompt the user for a value. If the predetermined number of users have encountered both field names and the confidence value is greater than the first threshold and less than a second threshold, then the system 125 may prompt the user to accept or reject the association. If the user accepts the rejection, then the system may enter the value from the data file into the field; otherwise, the user may enter a new value. If the predetermined number of users have encountered both field names and the confidence value is greater than the second threshold, then the system may automatically populate the field with the value from the data file. The system 125 will also update the statistics in the field name dictionary data structure 121 based on the user's choices.

As mentioned above, the data representing values that correspond to form field names are divided into two categories: user data and company data. User data include values that are for a particular user, such as name, address, social security number, etc. User data for a given user can be edited by the given user. In some embodiments, the user has the option to save personal information in the user data files to the server. In some embodiments, the user can choose to keep the personal information in the user data file on a personal storage device (e.g., a USB drive, SD card, etc.).

Company data include data specific to a company, such as a company employing the user or a company that is a client of the employer or user. Company data for a given company cannot be edited by a user unless the user has the appropriate access privileges. For example, a human resources (HR) administrator may have access to company data, and certain employee data files, and can modify these data files as necessary. In some embodiments, the intelligent form filling system 125 is integrated with authentication profiles (e.g., LDAP, OIDC, etc.) to provide access to company data files 123 and individual user data files 122 at the server 120.

FIG. 2 depicts an example user data file in accordance with an embodiment. User data file 200 includes name-value pairs, also referred to as key-value pairs, associating field names with values corresponding the field names. For example, for the field named "First Name," the user has entered a value of "Echo." When a field having a field name of "First Name" is encountered in a subsequent form filling session, in the same form or a different form, the intelligent form filling system 125 will either automatically populate the field with the value "Echo" or will prompt the user to accept the value or enter a new value. Furthermore, as seen in FIG. 2, the user has entered the same value of "223 Leisure Street" for fields named "Home Address," "Current Address," and "Address." When a field having a field name matching any of these three field names is encountered in a subsequent form filling session, the intelligent form filling system 125 will either automatically populate the field with the value "223 Leisure Street" or will prompt the user to accept the value or enter a new value.

FIG. 3 depicts an example company data file in accordance with an embodiment. Company data file 300 includes name-value pairs associating field names with values corresponding to the field names. For example, for the field named "Employer ID Number," the value of "882413" has been entered by a user. These values may be entered by a user with the appropriate access privileges when filling a form. Alternatively, these values may be entered directly into the company data file by a user with the appropriate access privileges to provide up-to-date company information for individual users when filling forms. As seen in FIG. 3, the field names of "Billing Address" and "Shipping Address" are associated or linked such that the same value will be applied for both field names. This is a decision that can be made only by a user with the appropriate access privileges.

Figure 4:
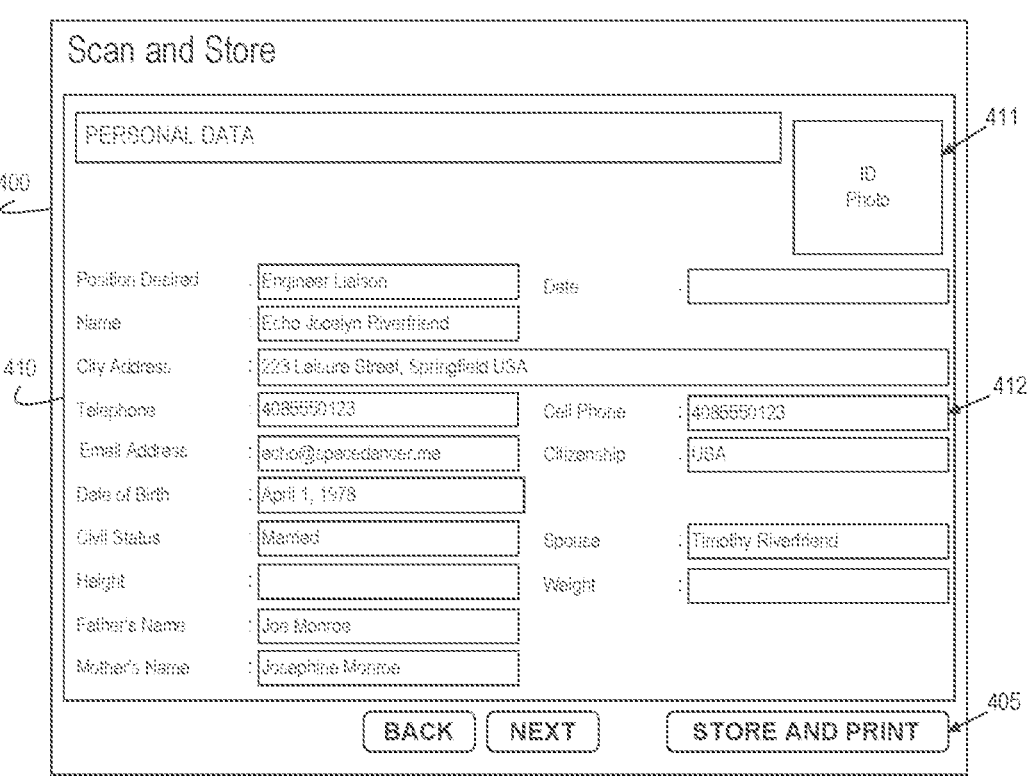
FIG. 4 depicts an example user interface screen in accordance with an embodiment.

FIG. 4 depicts an example user interface screen in accordance with an embodiment. User interface screen 400 includes a data entry portion 410 and one or more controls 405. The data entry portion 410 includes field names and field entry portions 411, 412 for entering values corresponding to the field names. In accordance with one embodiment, the intelligent form filling system 125 automatically fills in values from one or more data files into the field entry portions 411, 412. Prepopulated values can be highlighted on the screen (e.g., in blue color) so that the user can identify which values were populated from the data file, and fields for which no value is found can also be highlighted (e.g., in red color) (the highlight colors will not be printed).

The user can then edit the values if they are out of date or incorrect. In response to a user editing a value, the system 125 can prompt the user whether to update the data file to the new value. In the depicted example, field entry portion 411 corresponds to a field named "ID Photo." In this case, selection of the field entry portion 411 opens a dialog to enter a file name, including directory path, or link (e.g., uniform resource locator (URL)) to an image file. The value for the ID Photo filed is then saved as the file name or link.

In the example shown in FIG. 4, the controls 405 include a "BACK" button, a "NEXT" button, and a "STORE AND PRINT" button. The data entry portion 410 displays a portion of the form fields. The "BACK" and "NEXT" buttons allow the user to navigate to a previous and next portion of the form fields, respectively. If the user is finished filling the form, selection of the "STORE AND PRINT" button causes the filled form document to be stored, such as in a local storage or at the server computer 120, and printed, such as by one of the MFP devices 111-112.

Figures 5, 6:
FIG. 5 depicts an example dropdown user interface component that allows a user to select between values in accordance with an embodiment.
FIG. 6 depicts an example user interface screen for editing a data file in accordance with an embodiment.

FIG. 5 depicts an example dropdown user interface component that allows a user to select between values in accordance with an embodiment. If the field name matches multiple field names or matches a field name in two or more data files, then the intelligent form filling system 125 causes to be displayed a dropdown user interface component 500 to allow the user to select a value. In the depicted example, the dropdown user interface component 500 includes a dropdown control 501 and a selection component 502. In response to the user selecting the dropdown control 501, the dropdown user interface component 500 displays the selection component 502, which is populated with the values that may correspond to the field name. The user can then select the value for the field name from the selection component 502.

FIG. 6 depicts an example user interface screen for editing a data file in accordance with an embodiment. User interface screen 600 allows a user to enter, edit, or update values corresponding to field names in a data file. User interface screen 600 includes a data display portion and one or more controls. In one embodiment, the display portion displays commands that correspond to physical controls on the MFP device. For example, there may be physical buttons adjacent to the display that would correspond to the EDIT, STORE AND SAVE, and CLOSE commands. In another example, the MFP device has physical cursor control buttons for moving a cursor on the screen 600. For example, the user can use the cursor control buttons to select the EDIT, STORE AND SAVE, and CLOSE commands.

FIGS. 7A-7D depict example user interface screens for a multi-function peripheral device in accordance with an embodiment. In one embodiment, the display portion displays commands that correspond to physical controls on the MFP device. For example, there may be physical buttons adjacent to the display that would correspond to commands displayed on the user interface screens. In another example, the MFP device has physical cursor control buttons for moving a cursor on the screen.

FIG. 7A depicts an example user interface screen 710 for overriding a value in a data file with an entered value in accordance with an embodiment. In some embodiments, the intelligent form filling system 125 assigns a priority to some data files over others. For example, the system 125 can assign a higher priority to a company data file 123 than to a user data file 122. The company data file has higher precedence over the data file if both data structures have the same name-value pair but different values. For instance, if the personal user data file has "Employee ID=396749" and the company data file has "Employee ID=396794," then the system would cause a dialog to be displayed to the user suggesting that the correct value is the value from the company data file. Priorities can be assigned by certain users.

After prepopulating a form, the system may prompt the user to validate the field names and their values to be saved into storage. FIG. 7B depicts an example user interface screen 720 for adding a newly encountered field name to a data file in accordance with an embodiment. If the user selects to store and save, then the name-value pair is stored.

FIG. 7C depicts an example user interface screen 730 for updating an out-of-date value in a data file with a newly added value in accordance with an embodiment. After validation and confirmation, the system has the latest up-to-date information for the user. Every time the user prints or sends a document, the system can automatically populate values into the form. The system can suggest which field names are associated or linked based on historical data input from multiple users. FIG. 7D depicts an example user interface screen 740 for prompting the user to associate fields and enter the same value when the field names are associated in the field name dictionary data structure in accordance with an embodiment.

FIG. 8 illustrates associating field names based on historic data input from multiple users in accordance with an embodiment. The system has a user data file 810, a user2 data file 820, a user3 data file 830, and a user4 data file 840. As seen in FIG. 8, the user1 data file 810 has an association between "Home Address" and "Current Address" and an association between "Billing Address" and "Shipping Address"; the user2 data file 820 has an association between "Home Address" and "Address," an association between "Present Address" and "Current Address," and an association between "Billing Address" and "Shipping Address"; the user3 data file has an association between "Present Address" and "Current Address" and an association between "Billing Address" and "Shipping Address"; and, the user4 data file has an associated between "Home Address" and "Address" and an association between "Billing Address" and "Shipping Address." Based on this historical data input, the system generates associations in field name dictionary data structure 850. In the depicted example, the associations include an association, such as an association between "Present Address" and "Current Address," and historical data, such as a percentage of users that match the field names to an equivalent value.

In some embodiments, the intelligent form filling system 125 evaluates data files and identifies values that are likely to be out of date. In one embodiment, the system 125 assigns update conditions, such as time periods, to certain fields, such as "Phone Number" and "Present Address," that are known to change over time. The system 125 can also apply machine learning models to identify patterns associated with certain fields. For example, the system can determine that the "Phone Number" field changes every five years on average while the "Present Address" field changes every ten years on average. In accordance with these embodiments, the system 125 reminds the user to update these values upon login in response to expiration of the assigned time periods.

In some embodiments, the intelligent form filling system 125 evaluates data files and the field name dictionary data structure and identifies field names that exist in the field name dictionary data structure. The system can then prompt the user to add these known field names with corresponding values to the data file to save time when filling subsequent form documents that may contain these fields.

Local Authentication Implementation

In accordance with an embodiment, the user authenticates locally by inputting a username and password, which is also stored on an external memory, such as a USB storage device or SD card, for authenticating the user. The user can store personal user data on a portable storage device or in an application on a smartphone. By default, the user's data file is empty. To add initial information, the user can insert the portable storage device into an MFP device 111-112 and manually edit the name-value pairs in the data file. In some embodiments, no personal information is stored on the MFP device, and the process executing on the MFP device cleans out the personal information once the user logs out of the MFP device.

In accordance with the embodiment, the MFP device 111, 112 has an interactive panel display that can render an input document. The MFP device has an optical character recognition (OCR) mechanism that can recognize text labels of a document, retrieves name-value pairs from the user's data file, and automatically populates the text fields in the form.

The intelligent form filling system, when installed locally at an MFP device, has a scan-to-store feature that allows the user to scan any filled document, even one filled in with handwritten values, or enter a filled electronic form document into the MFP device. The MFP device can scan a hard copy document and perform OCR to identify text labels (form field names) in the form and identify values that have been entered into the fields. For each field name and value, the user can confirm whether the value is correct for the field name. The user can also edit the values at this time. The MFP device can then store the values in association with the field names in the user's data file locally in the user's portable storage device.

In an embodiment, the MFP device has an edit-and-send or edit-and-print function that allows the user to scan an empty document into the MFP device and fill in the form using the user's data file. The intelligent form filling system 125, when installed locally on the MFP device 111, 112, matches text strings to label names in the user's data file on a portable storage device. If a field name matches a name-value pair in the user data file, then the system automatically populates the field in the form document. Prepopulated values can be highlighted on the screen (e.g., in blue color) so that the user can identify which values were populated from the data file stored locally at the MFP device, and fields for which no value is found can also be highlighted (e.g., in red color) (the highlight colors will not be printed).

Other functions can be implemented locally on an MFP device, such as those discussed above with reference to the server implementation. For example, the MFP device can store the field name dictionary data structure 121 and one or more company data files 123 locally. The intelligent form filling system 125, when implemented locally at an MFP device, can apply associations between form field names, generated as multiple users have filled forms at the MFP device in the past, to a subsequent form filling session by a user.

In some embodiments, a particular form filling session occurs locally at the MFP device, with personal information remaining in a portable storage device of the user, and the MFP device can synchronize changes to the field name dictionary data structure 121 and company data files 123 among MFP devices 111-112 and client computing devices 131-132 through network 102. For instance, an administrator user can update values in the one or more company data files 123, and these updates can be synchronized to copies of the company data files stored locally at MFP devices 111-112 and client computing devices 131-132. In addition, as users accept or reject associations between form field names, statistics relating to these choices can be kept locally at the MFP devices 111-112 and propagated to server 120 so the statistics can be updated in the field name dictionary data structure 121. Thus, the intelligent form filling system 125, when implemented locally at an MFP device with synchronization of the field name dictionary data structure 121, can apply associations between form field names, generated as multiple users have filled forms at any MFP device or client computing device in the past, to a subsequent form filling session by a user.

Procedural Overview

Figure 9:
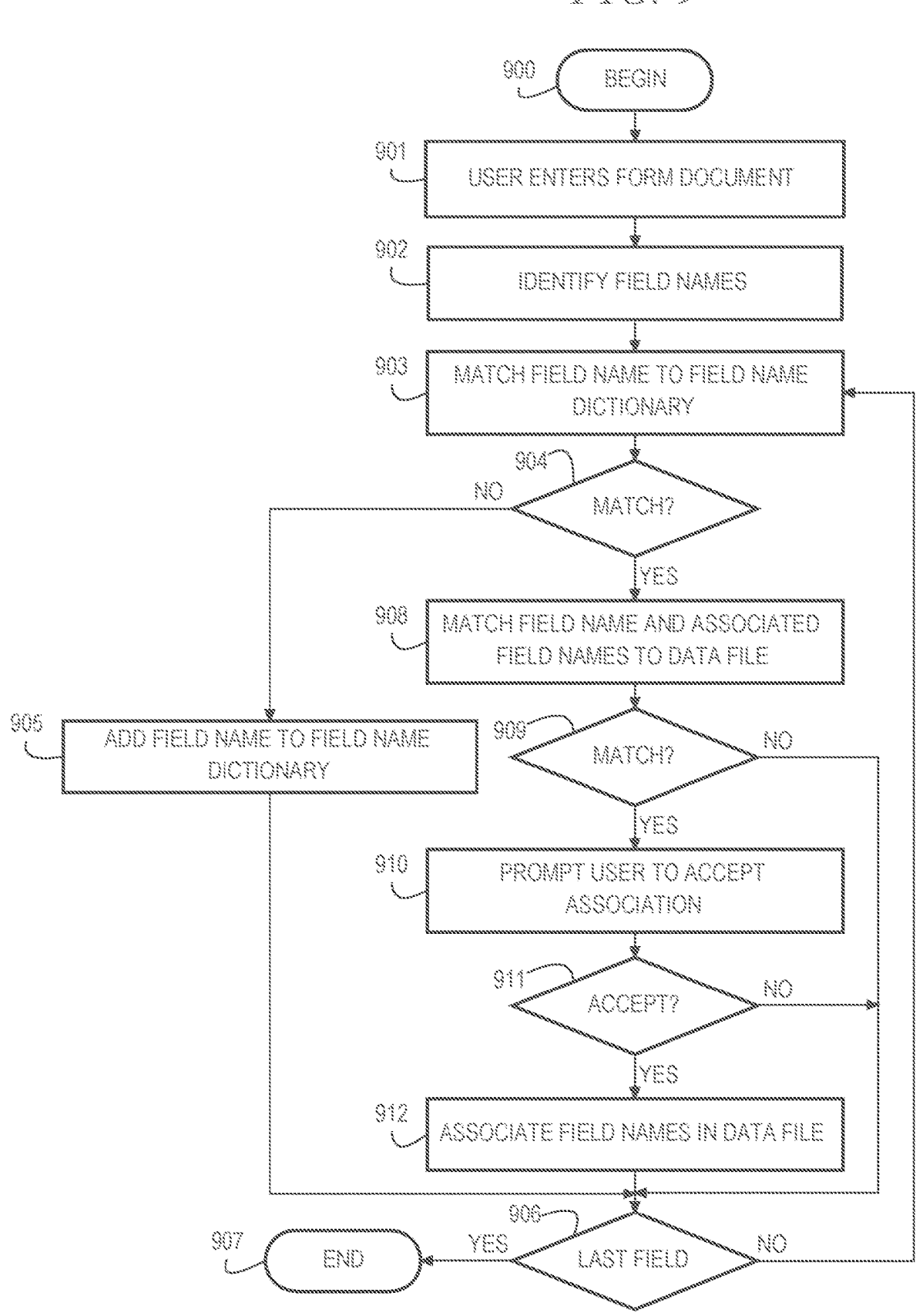
FIG. 9 is a flowchart illustrating operation of an intelligent form filling system generating and applying associations between form field names in accordance with an embodiment.

FIG. 9 is a flowchart illustrating operation of an intelligent form filling system generating and applying associations between form field names in accordance with an embodiment. Operation begins (block 900), and a user enters a form document (block 901). In one embodiment, the user enters the form document by loading an electronic form document into an MFP device or client computing device. An electronic document can be loaded from local storage or a portable storage device or can be retrieved from a remote storage device through one or more networks. In another embodiment, the user enters the form document by scanning a hard copy document and performing OCR on the document to identify field names and to identify form field entry portions.

The system identifies field names (block 902) and matches the field names to a field name dictionary data structure (block 903). In one embodiment, matching is performed using text pattern matching fuzzy logic, and/or machine learning techniques, such as a classification model, to determine whether text labels match known field names exactly or with some threshold confidence. The system determines whether a match is found (block 904). If a match is not found (block 904:NO), then the system adds the identified field name from the form document to the field name data structure (block 905).

The system then determines whether the identified field name corresponds to the last field in the form document (block 906). If the identified field name does not correspond to the last field name in the form document (block 906:NO), then operation returns to block 903 to match the next identified field name. If the identified field name corresponds to the last field name in the form document (block 906: YES), then operation ends (block 907).

If the identified field name matches a field name in the field name dictionary data structure (block 904: YES), then the system matches the field name and other field names associated with the identified field name in the field name dictionary to a data file (block 908). In accordance with the embodiment, the data file stores name-value pairs that associate values with one or more associated or linked field names. In one embodiment, matching is performed using text pattern matching, fuzzy logic, or machine learning techniques, such as a classification model, to determine whether identified field names match field names in a data file exactly or with some threshold confidence. In some embodiments, the system matches identified field names to multiple data files, such as a user data file associated with the user and one or more company data files. The system determines whether a match is found (block 909). If a match is not found (block 909:NO), then operation proceeds to block 906 to determine whether the identified field name corresponds to the last field in the form document.

If a match is found (block 909: YES), then the system prompts the user to accept the association (block 910) and determines whether the user accepts the association between the field names (block 911). If the user does not accept the association (block 911:NO), then operation proceeds to block 906 to determine whether the identified field name corresponds to the last field in the form document. If the user accepts the association (block 911: YES), then the system associates the field names in the data file (block 912), and operation proceeds to block 906 to determine whether the identified field name corresponds to the last field in the form document. A value will be assigned to the field as discussed in other sections of this document and as discussed with reference to FIG. 10 below.

Figure 10:
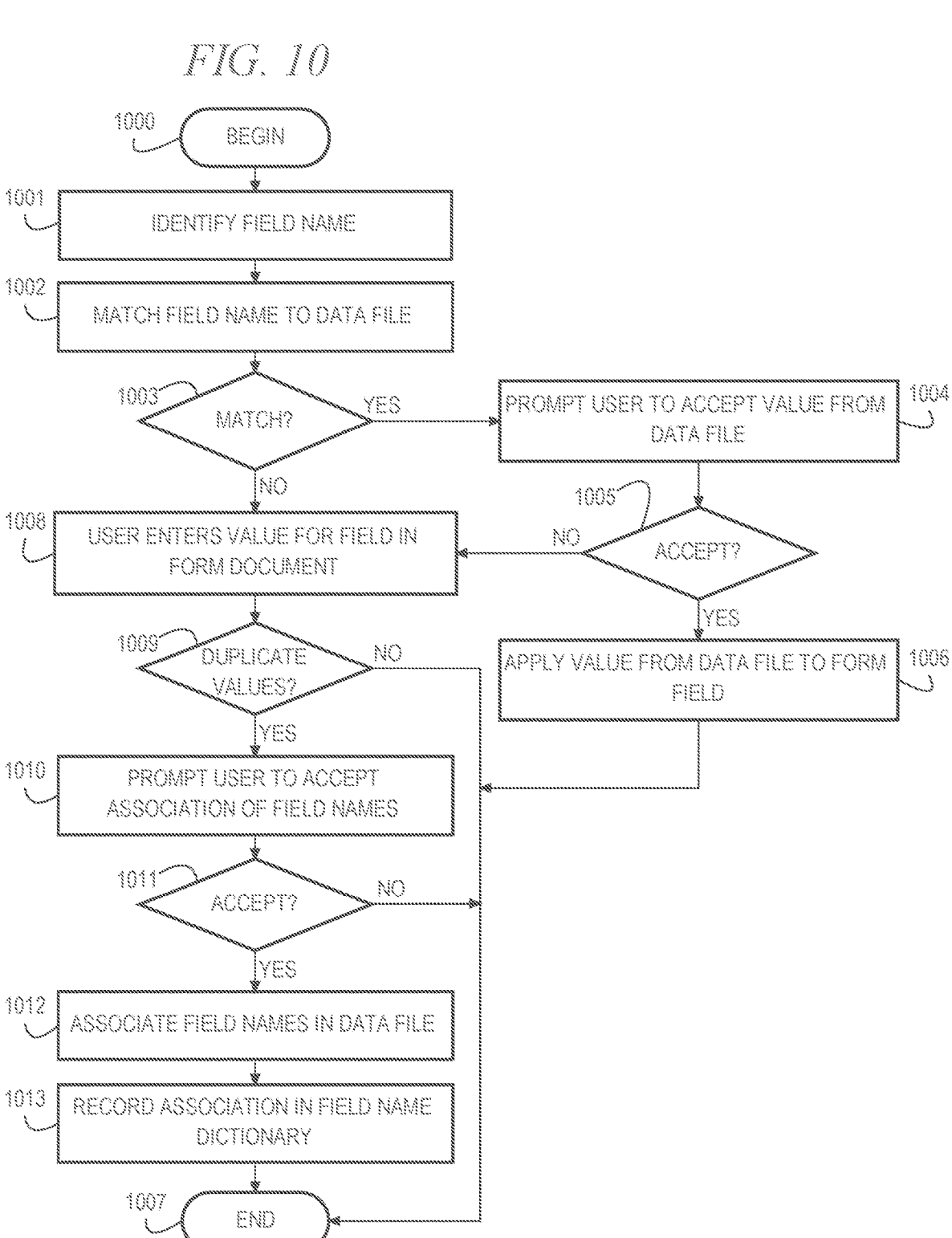
FIG. 10 is a flowchart illustrating operation of an intelligent form filling system for applying a value to a form field in accordance with an embodiment.

FIG. 10 is a flowchart illustrating operation of an intelligent form filling system for applying a value to a form field in accordance with an embodiment. Operation begins with a form document being loaded or scanned into a device (block 1000). The system identifies a field name in the form document (block 1001) and matches the field name to a data file (block 1002). In accordance with the embodiment, the data file stores name-value pairs that associate values with one or more associated or linked field names. In one embodiment, matching is performed using text pattern matching, fuzzy logic, or machine learning techniques, such as a classification model, to determine whether identified field names match field names in a data file exactly or with some threshold confidence. In some embodiments, the system matches identified field names to multiple data files, such as a user data file associated with the user and one or more company data files. The system determines whether a match is found (block 1003).

If a match is found (block 1003: YES), then the system prompts the user to accept the value from the data file (block 1004) and determines whether the user accepts the value from the data file (block 1005). If the user accepts the value (block 1005:YES), then the system applies the value from the data file to the form field (block 1006). Thereafter, operation ends for that identified field name (block 1007).

If a match is not found (block 1003:NO) or the user does not accept the value from the data file for the identified field name (block 1005:NO), then the user enters a value for the field in the form document (block 1008). The system determines whether entering the value in block 1008 results in duplicate values for two or more field names in the data file (block 1009). If entering the value does not result in duplicate values (block 1009), then operation ends for the identified field name (block 1007).

If entering the value in block 1008 results in duplicate values for two or more field names in the data file (block 1009: YES), then the system prompts the user to accept an association between the field names (block 1010) and determines whether the user accepts the association (block 1011). If the user does not accept the association (block 1011:NO), then operation ends for the identified field name (block 1007). If the user accepts the association (block 1011:YES), then the system associates the field names in the data file (block 1012) and records the association in the field name dictionary data structure (block 1013). Thereafter, operation ends for the identified field name (block 1007).

Figure 11:
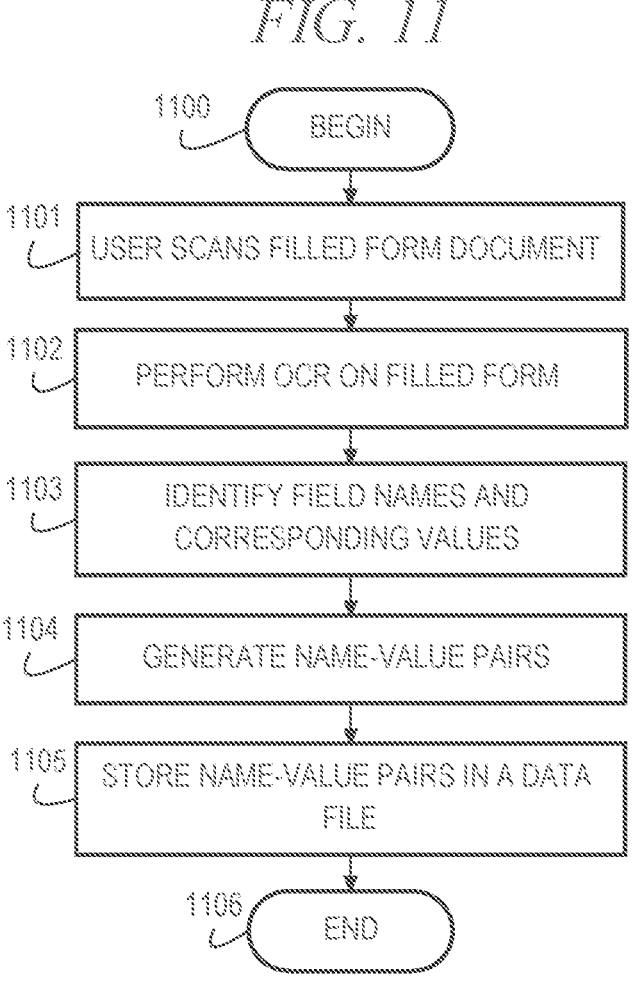
FIG. 11 is a flowchart illustrating operation of an intelligent form filling system for performing a scan-and-store function in accordance with an embodiment.

FIG. 11 is a flowchart illustrating operation of an intelligent form filling system for performing a scan-and-store function in accordance with an embodiment. Operation begins (block 1100), and the user scans a filled form document (block 1101). The system performs optical character recognition (OCR) on the filled form (block 1102). The system identifies field names and corresponding values in the filled form (block 1103) and generates name-value pairs associating field names with corresponding values (block 1104). The system stores the name-value pairs in a data file (block 1105). Thereafter, operation ends (block 1106).

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
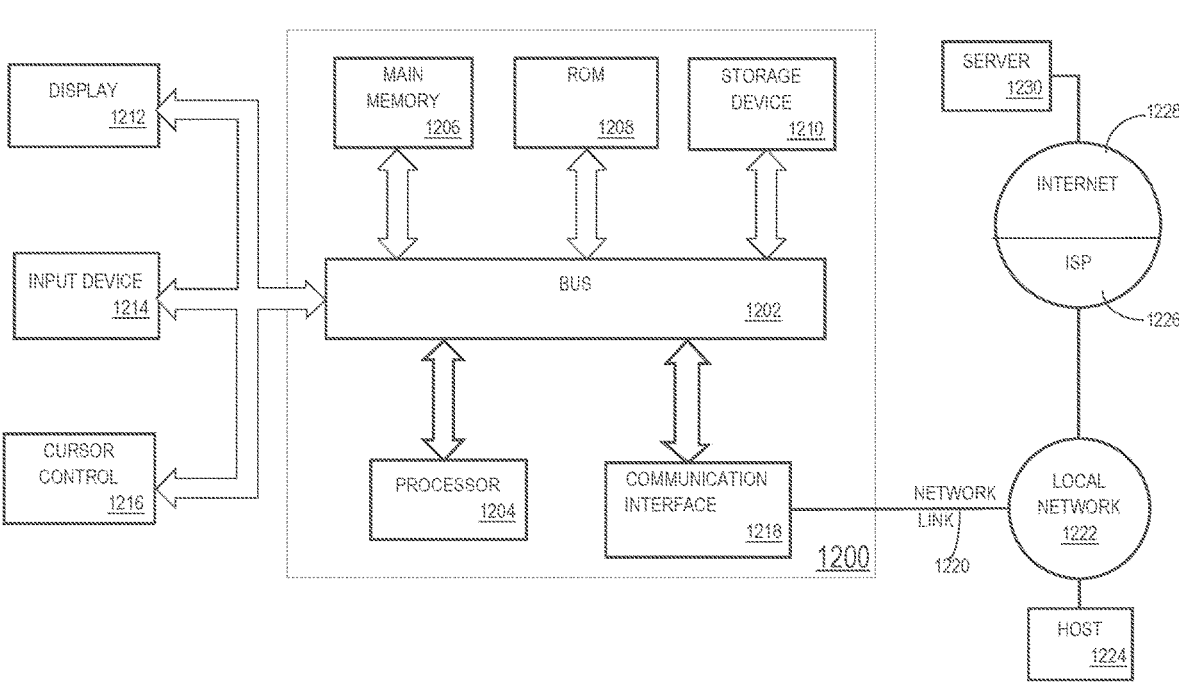
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for intelligent form filling, the method comprising:
generating an association between a first field name and a second field name based on entry of field values by at least a first user into a first form document at a first device within a plurality of devices connected to a network;

storing the association in a field name dictionary data structure at a server device connected to the network to form a field name association;

storing a data file containing name-value pairs associating values with field names for a second user, a company employing the second user, or a client of the company employing the second user;

receiving a second form document provided by the second user at a second device within the plurality of devices;

identifying a field name in the second form document that matches the first field name or the second field name in the field name association;

causing to be presented to the second user a prompt to associate the first field name and the second field name in the data file; and storing, in the data file, a name-value pair associating, based on a response by the second user to the prompt, a field value with:

only the identified field name, or both the first field name and the second field name, wherein the method is performed by one or more computing devices.

2. The method of claim 1, wherein generating the association between the first field name and the second field name comprises determining a confidence value indicating a confidence that the first field name and the second field name refer to the same field.

3. The method of claim 2, wherein the confidence value is based on a percentage of users who enter a same value into a field corresponding to the first field name and a field corresponding to the second field name.

4. The method of claim 2, wherein storing the association comprises storing the confidence value in association with the field name association in the field name dictionary data structure.

5. The method of claim 2, wherein the prompt includes a presentation of the confidence value to the second user.

6. The method of claim 1, further comprising:

determining that the second user enters a field value into a field corresponding to the identified field name in the second form document, wherein causing the prompt to be presented to the second user is performed in response to determining that the second user enters the field value into the field corresponding to the identified field name in the second form document; and storing, in the data file, the name-value pair associating the first field name and the second field name with the entered field value in response to the second user providing input indicating acceptance of the field name association.

7. The method of claim 1, further comprising:

determining that the second user enters a field value into a field corresponding to the identified field name in the second form document, wherein causing the prompt to be presented to the second user is performed in response to determining that the second user enters the field value into the field corresponding to the identified field name in the second form document; and storing, in the data file, the name-value pair associating the identified field name with the entered field value in response to the second user providing input indicating rejection of the field name association.

8. The method of claim 1, further comprising:

identifying a particular field name that exists in the field name dictionary data structure and does not exist in the second form document; and causing to be presented to the second user a prompt to enter a value for the particular field name.

9. The method of claim 1, further comprising:

identifying a particular field name in the second form document that matches a given field name in the data file; and causing to be presented on the second device a prompt to enter a value associated with the given field name in the data file into the second form document in association with the particular field name.

10. The method of claim 9, further comprising:

in response to the second user entering a new value for the particular field name, causing the value associated with the given field name in the data file to be updated to the new value.

11. The method of claim 1, wherein:

the data file is a user data file, and the method further comprises:

identifying a particular field name in the second form document that matches a given field name in the user data file and matches the given field name in a company data file; and causing to be presented on the second device a prompt including a first option to enter a first value associated with the given field name in the user data file and a second option to enter a second value associated with the given field name in the company data file into the second form document in association with the particular field name.

12. The method of claim 1, further comprising causing to be displayed to the second user a graphical user interface allowing the second user to edit name-value pairs in the data file.

13. The method of claim 1, further comprising:

in response to detecting an update condition for a given value in the data file, causing to be presented to the second user a prompt to update the given value.

14. The method of claim 1, wherein the first device or the second device is a multi-function peripheral device.

15. The method of claim 1, wherein:

the second device is a multi-function peripheral device, the second form document is a hardcopy form document being scanned by a scanner of the multi-function peripheral device to form a digital image of the hardcopy form document, and the method comprises performing optical character recognition on the digital image of the hardcopy form document.

16. The method of claim 1, further comprising:

authenticating the second user using an authentication profile; and permitting access to the data file in response to the second user having corresponding access privileges.

17. The method of claim 1, wherein identifying the field name in the second form document that matches the first field name or the second field name in the field name association comprises matching the field name in the second form document to the first field name or the second field name using string pattern matching, fuzzy logic, or a classification machine learning model.

18. One or more non-transitory storage media storing instructions which, when executed by one or more computing devices, cause:

generating an association between a first field name and a second field name based on entry of field values by at least a first user into a first form document at a first device within a plurality of devices connected to a network;

storing the association in a field name dictionary data structure at a server device connected to the network to form a field name association;

storing a data file containing name-value pairs associating values with field names for a second user, a company employing the second user, or a client of the company employing the second user;

receiving a second form document provided by the second user at a second device within the plurality of devices;

identifying a field name in the second form document that matches the first field name or the second field name in the field name association;

causing to be presented to the second user a prompt to associate the first field name and the second field name in the data file; and storing, in the data file, a name-value pair associating, based on a response by the second user to the prompt, a field value with:

only the identified field name, or both the first field name and the second field name.

19. An apparatus comprising:

one or more processors; and one or more memories communicatively coupled to the one or more processors and storing instructions which, when processed by the one or more processors, cause:

generating an association between a first field name and a second field name based on entry of field values by at least a first user into a first form document at a first device within a plurality of devices connected to a network;

storing the association in a field name dictionary data structure at a server device connected to the network to form a field name association;

storing a data file containing name-value pairs associating values with field names for a second user, a company employing the second user, or a client of the company employing the second user;

receiving a second form document provided by the second user at a second device within the plurality of devices;

identifying a field name in the second form document that matches the first field name or the second field name in the field name association;

causing to be presented to the second user a prompt to associate the first field name and the second field name in the data file; and storing, in the data file, a name-value pair associating, based on a response by the second user to the prompt, a field value with:

only the identified field name, or both the first field name and the second field name.

* * * * *